United States Patent Office 3,340,237
Patented Sept. 5, 1967

3,340,237
RESINOUS CONDENSATES
Lucien Sellet, Saddle River, N.J., assignor to Nopco Chemical Company, Newark, N.J., a corporation of New Jersey
No Drawing. Original application Oct. 5, 1960, Ser. No. 60,576, now Patent No. 3,223,751, dated Dec. 14, 1965. Divided and this application Feb. 23, 1965, Ser. No. 434,669
2 Claims. (Cl. 260—78.4)

This application is a divisional application of Ser. No. 60,576, Sellet, filed Oct. 5, 1960, now Pat. No. 3,223,751.

The present invention relates to novel compositions of matter, their preparation from (a) anionic linear polymers and (b) cationic and amphoteric aminoplast resins and/or their amino and amphoteric amino resin bases, and their utilization, particularly in the treatment of porous or fibrous substrates.

It is an object of the present invention to provide for novel treating agents, especially for porous or fibrous substrates which are obtained from anionic linear polymers and cationic and amphoteric aminoplast resins as well as their amino and amphoteric amino bases. It is a further object to provide for novel treating agents which when utilized in connection with said porous or fibrous substrates bring about enhanced properties of said substrates. Another object is to provide for procedures for preparing said novel treating agents. A still further object is to provide for improved leather, paper and textile treating agents which impart improved properties when applied to said substrates in such operations as retanning, tanning, dyeing, pigment dispersing, coating, textile finishing and adhesion. Other objects will become apparent from the detailed description given hereinafter. It is intended, however, that the detailed description and specific examples do not limit the invention but merely indicate preferred embodiments thereof since various changes and modifications within the scope of the invention will become apparent to those skilled in the art.

The above as well as other objects have been most unexpectedly and successfully achieved in the following manner. I have prepared and utilized in the treatment of various porous or fibrous substrates, resinous products which broadly can be described as mixtures of, complex salts of and condensates of (a) modified and unmodified water soluble anionic linear polymers and (b) water soluble and water dispersible cationic and amphoteric aminoplast resins. In the case of condensates of (a) and (b) above, I can utilize amino resin bases and amphoteric amino resin bases in lieu of the aminoplast resins. By the term mixtures, I mean mixtures of completely neutralized anionic linear polymers and cationic or amphoteric aminoplast resins. By complex salts, I mean the salt formed by reaction between an anionic linear polymer in its free acid form or partially neutralized form and a cationic or amphoteric aminoplast resin. To form the complex salts, the resin functions as a base.

The above products as will be shown subsequently are useful as pretanning agents, retanning agents, tanning agents and as auxiliary tanning agents for preparing improved leather products. Outstanding success has been found when leather resulting from metal salt tannages is treated with my products. For example, my products impart to the leather outstanding light fastness, increases fullness and loading, enhanced tensile strength and smooth grain. These products can be successfully used in such diverse applications in the tanning industry as in the preparation of garment, shoe, glove, suede, sole and mechanical leathers. Also, it has been found that fat liquoring operations are greatly enhanced. This is of special value for leather wherein zirconium salts have been utilized because I have found that my materials prevent the zirconium from reacting with the fat liquoring agents.

My products impart improved properties to substrates other than leather. For example, when applied as dye assistants, improved color values and better leveling are obtained in many instances. Some of these products can be utilized as pigment dispersing agents, as agents in fiber and paper coating and as additives in paper making. When added to the beater, they serve as fillers and also improve wet resistance of the resulting paper. They have been found to contribute to enhance fullness of the treated material, to supply special finishing effects and to exhibit binding and adhesive properties.

The application of my products in connection with a porous or fibrous substrate such as leather can be explained as follows. When a mixture or a complex salt of my two components, viz., the anionic linear polymer and the cationic aminoplast or amphoteric aminoplast resin is used, the mixture or complex salt is applied to the leather in the form of an aqueous solution or dispersion thereof by contacting the leather with said mixture. After the mixture or complex salt is colloidally absorbed to its greatest extent in the leather or other substrate, the pH is progressively lowered at intervals to a pH of about 2.5. In this manner, the cationic and anionic functional groups present in the mixture or complex salt of the anionic linear polymer and aminoplast resin are activated and interreacted, thus bringing about precipitation in the fibers of the leather or other porous or fibrous substrate. Alternatively, when a mixture of my two components is used, viz., a completely neutralized anionic linear polymer and a cationic or amphoteric aminoplast resin, the leather can be contacted with the two components successively and finally the two components are interreacted by lowering the pH to about 2.5 to bring about precipitation. Likewise, the two components which make up the complex salt, viz., the anionic linear polymer in its free acid or partially neutralized form and the cationic or amphoteric aminoplast resin can be applied successively to the leather thus forming the complex salt in the leather. Then the pH can be lowered as indicated above to bring about precipitation in the leather. It must be appreciated however, that the pH value of 2.5 represents an average since this value will vary somewhat depending upon the nature of the mixture or complex salt of my two components which is added. The lowering of the pH can be accomplished by the introduction of water soluble mineral acids, water soluble organic carboxylic and hydroxy carboxylic acids and water soluble acidic metal salts. Examples of the above agents utilized to lower the pH are hydrochloric acid, sulfuric acid, sulfonic acid, formic acid, acetic acid, glycollic acid, diglycollic acid, lactic acid, citric acid, tartaric acid, oxalic acid, aluminum sulfate, basic chrome sulfate and sodium bisulfate.

When a condensate of my two components is utilized, it is applied to the fibrous or porous substrate in a neutral form. Then the pH is progressively lowered at intervals to a pH of about 2.5. In this manner, the cationic and anionic functional groups present in the condensate are activated and interreact thus bringing about precipitation of the condensate in the substrate. Here again, it must be appreciated that the pH value of about 2.5 represents an average since this value will vary depending upon the nature of the condensate. Lowering of the pH can be carried out by using the same water soluble acids and water soluble metal salts referred to previously.

Whether mixtures, complex salts or condensates of my two components are applied to a substrate, impregnation is achieved through colloidal adsorption or through direct affinity of the substrate for the treating agent depending upon the nature of the substrate.

It is known to utilize certain anionic linear interpolymers in the tanning of leather. For example, U.S. Patent No. 2,205,882, Graves, June 25, 1940 describes the use of partially neutralized maleic anhydridestyrene interpolymers as tanning agents. Also, it is known to utilize certain cationic aminoplast resins in the tanning of leather. However, the combination of these two classes of materials, as mixtures or complex salts to be precipitated in a substrate or as condensates to be precipitated in a substrate, has been found to bring about improved, indeed, superior results when compared with the use of the prior art indicated above. The outstanding lightfastness of leather treated with my products was most unexpected. This superiority is in contrast to the leathers treated with naphthalenic or phenolic synthetic tanning agents which have a deleterious effect on leather due to photochemical changes which they undergo. Moreover, the use of my materials also results in products having diverse utilities as indicated above. Additionally, many of the anionic linear polymers and many of the aminoplast resins described herein are in themselves new compositions of matter which can be utilized as taught herein.

Anionic linear polymers

The modified and unmodified water soluble anionic linear polymers can be described as follows. They are copolymers of maleic acid, maleic anhydride or itaconic acid and olefinic hydrocarbons which are copolymerizable therewith. The resulting polymer can be utilized in its free acid form or as a partially or completely neutralized ammonium or alkali metal salt, e.g., as the sodium or potassium salt. When the acid form of the copolymer is difficulty soluble or insoluble in water, then the partially or completely neutralized forms are used. In preparing the copolymers, useful comonomers for the maleic anhydride, maleic acid or itaconic acid are one or a mixture of the following ethylenically unsaturated monomers: ethylene, styrene, p-methyl styrene, vinyl ethers such as methyl vinyl ether, ethyl vinyl ether, propyl vinyl ether, vinyl esters such as vinyl acetate, acrylic esters such as methyl acrylate, ethyl acrylate, methyl α-methylacrylate, isobutylene, diisobutylene, acrylamide and substituted acrylamide such as butyl acrylamide. In the above polymers, the maleic anhydride, maleic acid or itaconic acid and the ethylenically unsaturated monomers which are copolymerizable therewith are present in approximately a 1:1 mol ratio. In the case of copolymers of salts of itaconic acid and acrylamide, from about one to three mols of acrylamide can be utilized per mol of itaconic acid salt.

The preparation of the above polymers is well known in the art and this invention is not to be limited by such preparations. Polymerization procedures which can be utilized can be found in, e.g., U.S. Patent No. 2,047,398, Voss et al., July 14, 1936; U.S. Patent No. 2,286,062, Condo et al., June 9, 1942; U.S. Patent No. 2,430,313, Vana, Nov. 4, 1947; U.S. Patent No. 2,490,489, Tauch, Dec. 6, 1949 and U.S. Patent No. 2,378,629, Hanford, June 19, 1945.

The above polymers if desired, can be modified such as by forming their amide ammonium salts or amide amine salts. Also, the polymers can be reacted with salts of sulfoaminomethane, and the modified amide ammonium salts of the polymers can be further treated with salts of sulfohydroxy methane and if desired can be further treated with formaldehyde. These reactions are performed in equimolar proportions with regard to the reactive groups involved. However, this can be varied so as to obtain products of varying characteristics, i.e., products having characteristics lying between the unmodified and completely modified polymers. In other words, the polymers can be partially modified as well as completely modified as indicated above. Thus, by the expression, modified, I mean partially modified as well as completely modified anionic linear polymers.

These modified anionic polymers can be used in connection with cationic and amphoteric aminoplast resins and aminoplast resin bases as described herein for preparing stable solutions having cationic and anionic functional groups which can be interreacted by addition of acids. They can also be advantageously used by themselves in leather treatment whereby the stability under acidic conditions can be of importance in operations such as pretanning, tanning of pickled stock or when metal salt tannages are first submitted to an anionic retanning operation followed by an aminoplast resin treatment or with mixtures of other aminoplast resins and anionic linear polymers. Observations indicate improved tightness of the grain when applied on metal salt tannages.

In preparing amide ammonium salts of the aforesaid polymers, ammonia gas is passed through the polymer in its anhydride form at room temperature or at slightly elevated temperatures. Two mols of ammonia gas are utilized per anhydride group.

When preparing amide amine salts, primary or secondary amines such as ethanolamine, diethanolamine and propanolamine are reacted with the polymer in its anhydride form at, e.g., 50° C. to 80° C. in an inert solvent such as dioxane or dimethylformamide. Two mols of amine are utilized per anhydride group. Of course, if further reaction of the amide amine salt is to be carried out, then only primary amines can be used in the preparation of the amide amine salt. The resulting water soluble compounds can be mixed with stable aminoplast resins to form stable solutions. The end use of the amide ammonium and amide amine salts is similar to those previously described when the free acids as well as the partially or completely neutralized linear polymers are used in conjunction with stable aminoplast resins. However, as the potential anionic property is weakened by the amide group, subsequent interreaction by acidification is of a lesser degree. Instead of a strong precipitate, only milky or colloidal or semicolloidal solutions are formed. Such forms of interreaction are desired particularly when better penetration and slower fixation in the substrate are required. The amide derivatives of the linear polymers are also suitable for condensation with aminoplast resins.

When modifying the polymers with salts of sulfoaminomethane, e.g., the alkali metal salts such as sodium and potassium, the following procedure can be used. The salt of sulfoaminomethane is reacted with a half salt of the polymer, i.e., a one-half neutralized polymer, which still has remaining one free carboxylic acid group. Reaction is achieved by heating and driving off the water formed during reaction. One mol of the salt of sulfoaminomethane is utilized per free carboxylic acid group of the polymer. Also, monosubstituted derivatives of the salts of sulfoaminomethane can be used such as the sodium salt of sulfohydroxyethylaminomethane. These condensates demonstrate increased acid stability.

Other useful and improved condensation products of anionic character are obtained when salts of sulfohydroxymethane, e.g., alkali metal salts such as sodium or potassium, are condensed with the amide ammonium salts of the anionic linear polymers heretofore described. One mol of the salt of sulfohydroxy methane is utilized for each amide group in the polymer. These anionic condensates can be further condensed under prolonged heating with formaldehyde which reacts with the ammonium salt to form methylol amine. One mol of formaldehyde is utilized per each ammonium salt group. The final condensate shows increased stability to metal salts and has good pigment dispersing and suspending qualities. When the amide ammonium salts of a copolymer containing approximately equimolar amounts of styrene and maleic anhydride are used in the condensation with the salt of sulfohydroxymethane, an acid stable anionic polymer is produced. Useful anionic polymers can also be produced when the amide group of the amide ammonium salt of the anionic linear polymer is condensed with itaconic acid. One mol of itaconic acid is utilized per amide group which is present in the polymer. It has been found that the alkali metal salts, e.g., sodium and potassium, of the condensate of itaconic acid and the amide ammonium salt of a polymer containing approximately equimolar quantities of ethylene and maleic anhydride are good pigment dispersing agents. When a copolymer containing approximately equimolar amounts of styrene and maleic anhydride as amide ammonium salt is used in the condensation with itaconic acid, a condensate is produced which shows good stability at lower pH.

A particularly outstanding copolymer is obtained when from about one to three mols of acrylamide are copolymerized with one mol of itaconic acid or one mol of a substantially neutralized salt of itaconic acid, e.g., the sodium, potassium or ammonium salt in presence of a polymerization catalyst, e.g., potassium persulfate. Heating at about 75° C. for approximately 4 hours is sufficient to bring about copolymerization. The resulting product is an outstanding dispersing agent and adhesive when utilized alone either in its free acid or substantially neutralized salt form. It can also be admixed with stable aminoplast resins for preparing stable solutions having cationic and anionic functional groups which can be interreacted by addition of acids. The copolymerization product of acrylamide and salt of itaconic acid can be modified through saponification of the amide groups which are present to various degrees. This is accomplished by treatment with an alkali, e.g., sodium or potassium hydroxide. An anionic linear polymer having outstanding dispersing properties will result. This product can be dried to form a white to tan easily water soluble material.

*Aminoplast resins and amino resin bases*

The cationic aminoplast resins, the amphoteric aminoplast resins, and their amino resin bases and amphoteric amino resin bases can be described as follows. The cationic aminoplast resins are prepared by interreacting or condensing an amino resin base with an aldehyde, preferably formaldehyde, or a compound which liberates formaldehyde such as paraformaldehyde, trioxane and hexamethylenetetramine. The amino resin bases can be characterized as low molecular weight nitrogen containing compounds which, by reaction between the hydrogen of the amine with aldehydes, form methylol derivatives in monomeric or polymeric form thus producing resinous materials of colloidal nature.

Examples of amino resin bases which are condensed with formaldehyde are dicyandiamide, guanidine, guanylurea, urea, thiourea, biuret, molamine, ameline, amelide, cyanuric acid, guanamine as well as their mixtures and derivatives. The aminoplast resins obtained as indicated above are generally characterized as cationic to various degrees, as water soluble or water dispersible and preferably should have a long and unlimited shelf life, i.e., should not undergo physical or chemical change upon standing for long periods of time. Exemplary of these cationic amnioplast resins are those described in British Patent No. 777,827, June 26, 1957. The resins described herein are characterized by their excellent shelf life. This results from the elimination of free methylol groups of the resin by reaction with aminoplast bases such as those given above. Other useful cationic aminoplast resins are those set forth in U.S. Patent No. 2,847,396, Sellet, Aug. 12, 1958, i.e., the resins prepared in column 1, line 71 to column 2, line 15. The degree of cationic activity in the aminoplast resin is shown by interreaction with anionic materials and is related to the degree of polymerization and molecular size. Aminoplast resins which are strongly cationic in nature are the higher molecular weight resins having a high degree of polymerization. Aminoplast resins having a lesser degree of cationic activity have lower molecular weights resulting from a lower degree of polymerization. Also, the presence of carbonamide groups tends to reduce the degree of cationic activity.

The amphoteric aminoplast resins are cationic aminoplast resins which have been modified by introducing anionic substituents into them such as carboxy groups and sulfo groups. The nature of the anionic substituent taken in connection with the nature of the cationic substituents of the aminoplast resin will determine whether cationic or anionic properties will predominate in the amphoteric resin. That is, the amphoteric aminoplast resins can vary in their nature from predominately cationic to predominately anionic resins. The reason for utilizing aminoplast resins varying in nature from cationic to amphoteric, i.e., from strongly cationic to weakly cationic is as follows. When strongly cationic resins are utilized in connection with the anionic linear polymers, whether as mixtures, complex salts or condensates, and applied to a substrate such as leather and then precipitated with an acid, a fast inter-reaction occurs between the components, i.e., an immediate and heavy precipitate will be formed in the leather. On the other hand, when amphoteric aminoplast resins are utilized in connection with the anionic linear polymers, whether as mixtures, complex salts or condensates and applied to a substrate such as leather and then interreacted with an acid, a weaker and slower interreaction occurs between the components as compared to the reaction when a strongly cationic resin is used. This slower inter-reaction or precipitation is utilized when a more complete penetration is desired. Thus, when amphoteric aminoplast resins are utilized, an advantage is the fact that the acid sensitivity is of a lower degree.

Suitable amphoteric aminoplast resins are as follows. Any water soluble or water dispersible cationic aminoplast resin including those given above can be modified to form amphoteric resins by introducing either during or after their preparation anionic functional groups such as carboxylic and sulfo groups. Useful amphoteric aminoplast resins can be found in U.S. Patent No. 2,847,396, Sellet, Aug. 12, 1958. That is, the amino-modified stage A resins described therein can be modified as set forth in column 3, lines 9 to 38 of this patent. Likewise the resins obtained by carrying out stages one and two described in U.S. Patent No. 2,870,122, Sellet, Jan. 20, 1959 can be modified as set forth in column 4, lines 13 to 39 of this patent. The products prepared according to British Patent No. 777,827, June 26, 1957 are particularly suited for transformation into amphoteric aminoplast resins.

Other useful amphoteric aminoplast resins can be prepared by condensing unsaturated dibasic acids such as itaconic acid, maleic acid and maleic anhydride or their monoammonium salts with equimolar amounts of dicyandiamide in aqueous solution. Upon prolonged heating, e.g., at reflux for, e.g., four to six hours, condensation occurs simultaneously with saponification of the nitrile group. This has been demonstrated by infra-red analysis. Also, in the case of itaconic acid, the double bond disappears as indicated by infra-red analysis. This would indicate lactam formation. The above condensates, e.g., of itaconic acid and dicyandiamide, can be admixed with the anionic linear polymers previously described or alternatively condensed at elevated temperatures with said linear polymers. If desired, the condensates of dicyandiamide and itaconic or maleic acid or anhydride can be condensed with aldehydes. Preferably the condensate of itaconic or maleic acid and dicyandiamide is condensed with from one to four mols of aldehyde, e.g., formaldehyde and then mixed or condensed with the anionic linear polymers.

Another of aminoplast resin can be prepared by first preparing a mono ammonium or mono-primary amine salt of itaconic acid or maleic acid. The amine salts are obtained from reaction with lower alkanolamines such as ethanolamino. One mol of this product is in turn reacted with one mol of an aldehyde, e.g., formaldehyde, resulting in the acid salt of the methylolated amine. An amino resin base, dicyandiamide, in equimolar amounts with regard to the itaconic or maleic acid, is then introduced and condensed with the methylolated amine. Through prolonged heating in presence of water further condensation occurs between the newly formed amine compound, and the acid thus yielding a lactam. Also, the nitrile group is saponified. These products when further reacted with an aldehyde, e.g., from one to 4 mols can be admixed with the aforesaid anionic linear polymers to produce stable materials for treating the various substrates referred to herein. Preferably the amphoteric resins and the linear polymers are utilized in their partially or completely neutralized state. The above condensation products prepared from the itaconic or maleic acids or anhydride possess a higher cationic function property when compared with a condensate of itaconic acid and dicyandiamide alone.

Also, modified amino resin bases, e.g., the sodium or potassium salt of sulfo methyl dicyandiamide can be reacted with an aldehyde, e.g., from one to three mols of formaldehyde per mol of modified amino resin base and the resulting amphoteric aminoplast resin utilized in admixture or as a condensate with the anionic linear polymers.

Examples of useful amino resin bases which can be condensed with the anionic linear polymers are dicyandiamide, guanidine, guanylurea, urea, thiourea, biuret, melamine, ameline, amelide, cyanuric acid, guanamine, as well as their mixtures and derivatives. Examples of amino amphoteric resin bases which can be condensed with the anionic linear polymers are the sodium salt of sulfomethyl dicyandiamide and condensates of dicyandiamide and itaconic acid or maleic acid or maleic anhydride.

When my two components are utilized as mixtures or as complex salts with the anionic linear polymers and subsequently precipitated upon a substrate by addition of an acid, they can be utilized in approximately equimolar amounts. However, this is not to be construed as a limiting relationship because either of my two components can be present in varying molar excesses over the other component. This will depend upon the final effects which are desired. For example, leather treated with a copolymer containing approximately equimolar amounts of styrene and maleic acid will receive dye rather poorly. However, even to the presence of a small amount of aminoplast resin will enhance the affinity of the dye. Thus, as merely indicative, but not limiting, my two components when utilized as mixtures or complex salts can be present in a molar relationship of from 1:15 to 15:1 with regard to each other.

When my two components are utilized either as a mixture, complex salt or as a condensate in connection with the treatment of a substrate, the substrate is maintained in aqueous medium. Additionally, water soluble solvents, e.g., water soluble alcohols, glycols, esters and ethers can be present. My two components when utilized separately to form a mixture or as a complex salt or as a condensate can be added to the substrate as aqueous solutions, aqueous dispersions or as dry solids whenever the components are of such a nature that they can be obtained in the form of solids. For example, the anionic linear polymers as well as the cationic aminoplast resins and their amino and amphoteric amino resin bases can be prepared as solids by removing the water, e.g., by boiling, roll drying or spray drying to form solid material. The solid material can be ground or flaked as desired. Likewise, the condensates of the above components can be utilized as solutions, dispersions or as solids.

*Condensates of anionic linear polymers and aminoplast resins and amino resin bases*

With regard to the preparation of condensates of my two components, which can be applied to a substrate, the following is set forth.

Cationic aminoplast resins, preferably those which have their methylol groups substantially blocked off, can be condensed with anionic linear polymers which have a free carboxyl group available for reaction with the available hydrogen of the cationic aminoplast resin. Provision must be made so that the resulting condensate has amphoteric characteristics. This can be accomplished by condensing one mol of aminoplast resin with one mol of an anionic linear polymer which preferably has its second carboxyl group neutralized. That is, one mol of aminoplast resin is utilized for each free carboxy group of the linear polymer.

Water soluble anionic linear polymers in their free acid or as partially neutralized forms whether modified or unmodified, such as those heretofore described can be reacted with aminoplast resin bases such as those previously described. Thereafter, the resulting condensate can be subsequently reacted with an aldehyde, e.g., formaldehyde. For example, linear polymers which are water soluble as free acids or as their partially neutralized salts can be used as modifying agents for aminoplast resin bases such as dicyandiamide. When the two were dissolved in water in equimolar proportions and heated for several hours, the pH which at the start shows a pH value of 2.4, rose gradually to 4.6. Infra-red analysis showed disappearance of the nitrile group. Generally, a water solution or slurry in water of both reactants is first heated preferably near the boiling point of water. More heat is then applied to reach temperatures above 100° C., preferably between 115° to 120° C. in order to drive off the water and to bring about condensation. The reaction product is then treated with aldehyde, preferably 3 to 4 mols of formaldehyde to produce an aminoplast resin of amphoteric character. The reaction product is then substantially neutralized and forms a stable solution.

Other amphoteric condensates can be prepared by condensing the aforesaid anionic linear polymers wtih modified aminoplast and amphoteric aminoplast resin bases, e.g., the sodium or potassium salts of sulfo methyl dicyandiamide or the condensate of itaconic acid or maleic acid or anhydride and dicyandiamide. When an amino base is used, subsequent treatment with an aldehyde, preferably 1 to 4 mols of formaldehyde, is utilized.

Some of the aforesaid products which are useful in particular as pigment dispersing agents are obtained when an aminoplast resin base, in particular dicyandiamide, is first condensed with, e.g., itaconic acid to form an amphoteric resin base having reactive primary or secondary amino groups. Then further condensation with anionic linear polymers as free acids or their anhydrides is carried out. The amphoteric resin base and linear polymer are first dissolved in water, preferably in equimolar proportions. After evaporation of the water present, the condensation is carried through at temperature above 100° C. preferably between 110° to 120° C. The resulting condensation product is then neutralized to pH of 8.5 to 9.

Condensation products of similar characteristics can also be prepared by condensing a dicyandiamide maleic acid reaction product with said linear polymers. The above mentioned types of condensation products are particularly useful as pigment dispersants.

Other amphoteric condensates can be prepared by reacting amide ammonium salts of the aforesaid anionic linear polymers with methylolated amphoteric resins.

*Nature of substrate*

As previously indicated, my two components whether as a mixture, complex salt or as a condensate can be applied to many diverse subtsrates. Exemplary of these substrates are porous or fibrous substrates such as leather, paper, wool, cork, non-woven textiles or bats, such as felt and Masslin, woven textiles of cotton, wool, silk, rayon, regenerated cellulose, nylon, Dacron, polyacrylonitrile and others. When my two components are utilized as dye assistants they can be used in connection with the above indicated woven and non-woven textiles. Additionally, they can be used in connection with the dyeing of yarns and filaments. Synthetic yarns, filaments and woven and non-woven textiles can be treated with my components such as nylon, Dacron, polyacrylonitrile, etc.

In the treatment of a substrate such as leather from about 3% to about 20% of my products are utilized based on the weight of the wet shaved leather.

Throughout this specification, wherever molar amounts of linear polymer are referred to this means one reoccurring molar group regardless of the specific reactive substituents therein. For example, in a polymer obtained by copolymerizing equimolar quantities of itaconic acid and ethylene, each reoccurring itaconic acid-ethylene group ies deemed to be one molar group.

The following examples are directed to the preparation of mixtures, complex salts and condensates of my two components. It must be kept in mind that the mixtures can be applied to a substrate and then treated with acid to bring about interreaction and precipitation or else the substrate can be treated in succession with the two components after which the acid treatment is carried out. Likewise, in the use of complex salts, the complex salt can be applied to the substrate and then treated with acid to bring about interreaction and precipitation or else the substrate can first be treated in succession with the two components which react and form the complex salt after contact with the substrate and then treated with acid to bring about precipitation and interreacion.

EXAMPLE I

Preparation of anamphoteric aminoplast resin.

208 grams of sodium bisulfite were dissolved in 200 grams of water. 162 grams of formaldehyde (37% by weight aqueous solution) were then added to the bisulfite solution and the solution heated to 75° C. 168 grams of dicyandiamide were then introduced. Heat was applied to bring temperature up to 95° C. and was maintained for one hour. 326 grams of formaldehyde (37% by weight aqueous solution) were then added and the reaction completed by heating and refluxing for 5 hours at 95° C. The resulting reaction product was a water soluble amphoteric aminoplast resin.

532 grams of above resin solution was introduced with stirring into 526 grams of a 25% by weight aqueous solution of an anionic lienar copolymer which contained equimolar amounts of maleic anhydride and ethylene. The copolymer had been previously hydrolyzed so that it was in the form of its free acid.

The amphoteric aminoplast resin and the anionic linear polymer formed under addition of acids a slight semi-colloidal solution. This product is useful when good and even penetration of a substrate such as leather is required.

EXAMPLE II

A cationic aminoplast resin was prepared as follows.

168 grams of dicyandiamide, 648 grams of a 37% by weight aqueous solution of formaldehyde and 3.6 grams of borax were mixed together and refluxed at 95° C. for three and one-half hours. Then 336 grams of additional dicyandiamide were introduced and the mixture was heated and refluxed for nine hours at 90° C. to 95° C. The pH of the resulting resin was 9.7.

576 grams of the above resin solution were added to 1040 grams of a 25% by weight aqueous solution of a disodium salt of a copolymer prepared by completely neutralizing a copolymer containing equimolar amounts of maleic anhydride monomer and of styrene monomer.

Upon the addition of an acid the mixture of anionic linear polymer and cationic aminoplast resin interreacted to form a white precipitate.

EXAMPLE III 98 grams om maleic anhydride were dissolved in 500 cc. of water. 84 grams of dicyanidiamide were then introduced. The resulting solution was heated for 5½ hours under stirring at temperature of 102° C. to 103° C. 61 grams of paraformaldehyde were then added and additional heating was carried out at 95° C. for 4 hours. The resulting reaction product which was an amphoteric aminoplast resin was then neutralized to a pH of 8.0.

875 grams of the above amphoteric aminoplast resin were mixed with stirring with 1,075 grams of a 25% by weight aqueous solution of a disodium salt of a copolymer prepared by completely neutralizing a copolymer containing equimolar amounts of maleic anhydride and styrene. A heavy white precipitate was formed by addition of acid to the solution.

EXAMPLE IV 145 grams of a hydrolyzed maleic ethylene copolymer as the free acid prepared from a copolymer containing equimolar amounts of maleic and anhydride ethylene were dissolved in 500 grams of hot water. 68 grams of ammonium hydroxide were then introduced and the product stirred for 15 minutes. To this copolymer solution, 81 grams of formaldehyde (37% by weight aqueous solution) was introduced. Heating was then carried out at 75° C. for 1 hour. The formaldehyde reacted with the ammonium hydroxide to form amino hydroxy methane. 84 grams of dicyandiamide were then added and the temperature maintained at 95° to 100° C. for 1 hour. The resulting reaction mixture was then neutralized to pH of about 8.6.

The amino hydroxy methane prepared above and reacted with the dicyandiamide thus formed a cationic aminoplast resin sufficiently cationic in nature to react with the anionic linear polymer under acidic conditions. The product obtained according to the above is used in connection with an acid when a slower fixation of the inter-reacted material is desired in the substrate. The inter-reacted product is of a colloidal nature.

EXAMPLE V 130 grams of itaconic acid and 84 grams of dicyandiamide were dissolved in 500 grams of water and refluxed at temperatures between 102° C. to 105° C. for 5 hours. Then 61 grams of paraformaldehyde was added and heating continued for 7 hours at 101° to 103° C. The above reaction product was neutralized with caustic soda to a pH of 8.6. The resulting product was an amphoteric aminoplast resin.

865 grams of the above resin were then stirred into 970 grams of a 25% by weight aqueous solution of the monosodium salt of a styrene maleic copolymer prepared by partially neutralizing a copolymer containing equimolar amounts of maleic anhydride and of styrene. The pH of this solution was adjusted to 8.0.

Upon addition of an acid a white precipitate was produced.

EXAMPLE VI 824 grams of the itaconic acid dicyandiamide condensate (amphoteric aminoplast resin) of Example V were stirred in 830 grams of a 20% by weight aqueous solution of the monosodium salt of an ethylene maleic copolymer prepared by partially neutralizing a copolymer containing equimolar amounts of maleic anhydride and of ethylene. The above mixture interreacted upon the addition of acid thereby forming a white precipitate.

EXAMPLE VII

A cationic aminoplast resin was prepared by reacting 302 grams of guanylurea sulfate (1.0 mol) with 8 mols of formaldehyde (37% by weight aqueous solution) at 95° C. for 4 hours. The resulting condensation product was cooled down to 40° C. and then neutralized with caustic soda (40° Bé solution) to a pH of 9. Then six mols of urea (360 grams) were then added and the temperature raised rapidly to 95° C. and maintained thereat for one hour.

500 grams of the above resin were added with stirring to 500 grams of a 25% by weight aqueous solution of the monosodium salt of a copolymer prepared by partially neutralizing a copolymer containing equimolar amounts of maleic anhydride and of styrene.

When a mixture containing 10 grams of the product of this example, 90 cc. of distilled water and one gram of formic acid (90% active) was prepared, a white precipitate was formed. It was filtered off and the filtrate had a pH of 2.9.

When a mixture containing 10 grams of the product of this example, 90 cc. of distilled water and 0.5 gram of formic acid (90% active) a white precipitate was formed. It was filtered off and the filtrate had a pH of 3.2.

In the treatment of leather, it is preferable to use a slight excess of acid, i.e., an amount greater than that needed to bring about interreaction and precipitation in order to aid fixation of the additive, particularly of the anionic components or anionic functional groups.

This product is useful as a retanning compound on metal tannage and especially on chrome stock to produce increased fullness, smooth grain and light resistant bleach. It is also valuable as a dye assistant in coloring metal salt tanned leather, and as a dye assistant in producing level dyeing with increased color value and production of pastel shades.

It is well known that leather made with zirconium salts often offers difficulties when it has to be fatliquored. This difficulty did not occur when the leather was retanned with the above mentioned product.

EXAMPLE VIII

A cationic aminoplast resin was prepared as follows.

84 parts by weight of dicyandiamide and 162 parts by weight of a 37% by weight aqueous solution of formaldehyde were mixed together. The resulting mixture was heated to reflux, i.e., 95° C. After heating for about 25 minutes, 120 parts by weight of urea were introduced and heating at 95° C. was continued for 2 hours. Thereafter 162 parts by weight of a 37% by weight aqueous solution of formaldehyde were introduced and the reaction completed by heating for an additional 4 hours at 95° C. The pH of the final reaction product which was a stable cationic aminoplast resin was 8.9.

528 grams of the above cationic aminoplast resin were added with stirring to 500 grams of a 25% by weight aqueous solution of a monosodium salt of a copolymer prepared by partially neutralizing a copolymer containing equimolar amounts of styrene and of maleic anhydride. This product, like the product of Example VII is useful as an auxiliary tanning compound and dye assistant. Also, it is of use in textile processing and paper making.

EXAMPLE IX

An amphoteric aminoplast resin was prepared as follows.

84 parts by weight of dicyandiamide and 162 parts by weight of a 37% by weight aqueous solution of formaldehyde were mixed together. The resulting mixture was heated to reflux, i.e., 95° C. After heating for about 25 minutes, 120 parts by weight of urea were introduced and heating at 95° C. was continued for 2 hours. Thereafter 162 parts by weight of a 37% by weight aqueous solution of formaldehyde were introduced and the reaction completed by heating for an additional 4 hours at 95° C. The pH of the final reaction product which was a stable cationic aminoplast resin was 8.9.

The above cationic aminoplast resin was then reacted with an equimolar quantity of the sodium salt of sulfohydroxy methane at 95° C. for 4 hours. In this manner an aminoplast resin having amphoteric character was obtained.

100 grams of the above amphoteric aminoplast resin was mixed with 100 grams of a 25% by weight aqueous solution of the monosodium salt of a copolymer obtained by partially neutralizing a copolymer containing equimolar amounts of maleic anhydride and styrene.

Solutions of the above product are stable. This product when used as an auxiliary retanning agent by applying to leather and precipitating therein with acid demonstrated good penetration of the leather. The presence of the anionic group in the aminoplast resin assures a better controllable interreaction when applied to leather and treated with acid.

EXAMPLE X

An amphoteric aminoplast resin was prepared as follows.

98 grams of maleic anhydride were dissolved in 500 cc. of water and the temperature brought to 95° C. Then 84 grams of dicyandiamide were introduced. The pH of a 5% solution was 2.2. The temperature was then raised to 103° C. and maintained for 5 hours under reflux and stirring. Then 61 grams of paraformaldehyde were added and heating and refluxing continued at 95° C. for 4 hours. The pH of a 5% solution was 6.5. The reaction product was then neutralized to a pH of 8.0.

874 grams of the above reaction product were then stirred into 830 grams of a 20% by weight aqueous solution of a monosodium salt of a copolymer prepared by partially neutralizing a copolymer containing equimolar amounts of ethylene and of maleic anhydride.

Upon the addition of acids, the composition interreacted and formed a white precipitate.

EXAMPLE XI 530 grams of the cationic aminoplast resin of Example VIII were added with stirring to 970 grams (1 mol) of the monosodium salt of a partially neutralized copolymer containing equimolar amounts of styrene and maleic anhydride. The copolymer was utilized in the form of a 25% by weight aqueous solution.

The cationic aminoplast resin when acidified in the presence of the anionic linear polymer, formed therewith a stable solution of the half salt with the non-neutralized carboxylic acid functional group. The product can be applied to leather whereby it is adsorbed thereon and then acidified. It is useful as a retan on metal tannages.

The above product when utilized in retanning operations upon leather not only produces a light resistant bleach, but also increases the fullness and produces a soft tan. Solutions of this product can also be used for fiber coating. When added in small amounts to cellulose pulp in the beater, the product is absorbed by direct affinity. The anionic and cationic functional groupings are subsequently interreacted by the addition of acid or salts of acidic character. When a solution of the product is dried by applying heat, the aminoplast resin condenses with the linear polymer thus forming an amphoteric complex. In this manner a powdery material is obtained which is easily water soluble forming water clear solutions.

EXAMPLE XII

An amphoteric aminoplast resin was first prepared as follows.

104 grams of sodium bisulfite were dissolved in 100 grams of water. Then 81 grams of formaldehyde (37% by weight aqueous solution) were added with strong stirring while maintaining the temperature at about 75° C. Then 84 grams of dicyandiamide were added to form the sodium salt of sulfo methyl dicyandiamide. The mixture was heated to between 90° C. to 95° C. for 1 hour after which two mols (162 grams) of formaldehyde (37% by weight aqueous solution) were introduced and the reaction completed by heating for 5 hours at 95° C.

The above prepared amphoteric aminoplast resin was then introduced into 970 grams of a 25% by weight aqueous solution containing a monosodium salt of a copolymer prepared by partially neutralizing a copolymer containing equimolar amounts of styrene and of maleic anhydride thus forming a complex salt between the amphoteric resin and the half salt of the polymer.

This material when interreacted in the presence of acids is particularly suitable for bleaching and retanning chrome stock and where good penetration of the substrate, particularly leather, is required.

EXAMPLE XIII

An amphoteric aminoplast resin was prepared as follows.

104 grams of sodium bisulfite were dissolved in 100 cc. of warm water. Then 80 grams of formaldehyde (37% by weight aqueous solution) was gradually added to the sodium bisulfite solution. After addition, the temperature of the solution was maintained at 75° C. for 25 minutes. The product thus formed was the sodium salt of sulfohydroxy methane in aqueous solution.

896 grams of a stable guanylurea resin prepared in the same manner as the guanylurea resin of Example VII was condensed with the above solution of the sodium salt of sulfo hydroxy methane by heating for four hours at 95° C. At this point, 243 grams of formaldehyde (37% by weight aqueous solution) were introduced and heating under reflux at 95° C. for 3 hours was carried out to assure further condensation with the additional formaldehyde. The resulting product was an amphoteric aminoplast resin.

1420 grams of the above resin were admixed with 970 grams of a 25% by weight aqueous solution of the monosodium salt of a copolymer prepared by partially neutralizing a copolymer containing equimolar amounts of styrene and of maleic anhydride. A stable solution was formed. By the addition of an acid, to lower the pH, interreaction occurred.

In another example, 896 grams of the amphoteric guanylurea resin prepared above were admixed with 830 grams of a 20% by weight aqueous solution of the monosodium salt of a copolymer prepared by partially neutralizing a copolymer containing equimolar amounts of maleic anhydride and of ethylene. Upon the addition of an acid to lower the pH, a semicolloidal solution was formed. Use of this product brings about excellent penetration and a more even distribution of the interreacted product when carried out upon a substrate.

EXAMPLE XIV

Preparation of an amphoteric aminoplast resin.

130 grams of itaconic acid and 84 grams of dicyandiamide were dissolved in 300 grams of warm water. The resulting solution was heated for 5 hours at 105° C. The pH of a 5% solution was about 4.7. Thereafter 162 grams of formaldehyde (37% by weight aqueous solution) were added to the above solution and refluxing under stirring for 3 hours at 95° C. was carried out. The reaction product was subsequently neutralized with sodium hydroxide to pH of about 7.2.

500 grams of the above amphoteric aminoplast resin were stirred into 740 grams of a 25% by weight aqueous solution of a monosodium salt of a copolymer prepared by neutralizing a copolymer containing equimolar amounts of maleic anhydride and of ethylene. The resulting mixture reacted upon the addition of acid thus forming a strong white precipitate.

EXAMPLE XV

Preparation of an amphoteric aminoplast resin.

130 grams of itaconic acid were dissolved in 300 grams of water. Then 68 grams of ammonium hydroxide were added to form the monoammonium salt of itaconic acid. Then stirring for 15 minutes in flask equipped with a reflux condenser was carried out. To the above, 81 grams of formaldehyde (37% by weight aqueous solution) were introduced and heating at 70° C. for 1 hour carried out. 84 grams of dicyandiamide were then added and heating for 3 hours at 95° C. was carried out. An additional 162 grams of formaldehyde (37% by weight aqueous solution) was added and refluxing for 6 hours at 95°– 100° C. was carried out. The above reaction product was then neutralized to pH 8.0.

100 grams of above reaction product were introduced into 830 grams of 25% by weight aqueous solution of a monosodium salt of a copolymer prepared by partially neutralizing a copolymer containing equimolar amounts of ethylene and of maleic anhydride. In the presence of acids, to lower the pH, interreaction occurred as evidenced by a strong precipitate.

EXAMPLE XVI 126 grams of a maleic-ethylene co-polymer in its anhydride form and containing equimolar amounts of maleic anhydride and ethylene and 84 grams of dicyandiamide were dissolved in 540 grams of hot water. The resulting solution was refluxed under stirring for 5 hours at temperatures between 90° to 98° C. The 326 grams of Methyl Formcel (46% by weight aqueous solution) were then introduced slowly under stirring. The reaction mixture was then heated for 1 hour at 90° C. and subsequently neutralized to a pH of 7.5. By addition of acid to lower the pH, a white precipitate was formed.

Methyl Formcel is a commercial mixture containing 40% by weight formaldehyde, 53% by weight methanol and 7% by weight water.

EXAMPLE XVII 126 grams of a maleic ethylene co-polymer (in its anhydride form) and containing equimolar amounts of maleic anhydride and of ethylene and 84 grams of dicyandiamide, were dissolved in 540 grams of hot water. The resulting solution was refluxed for 11 hours at temperatures between 81° and 97° C. Then 326 grams of formaldehyde (37% by weight aqueous solution) were added and reacted for ½ hour at 80° C. Thereafter, 64 grams of methanol were added and heating for ½ hour at 80° C. was carried out. The resulting reaction product was neutralized with caustic soda to a pH of 8.2. The liquid formed a stable viscous solution. This product was then spray dried to a white easily water soluble product. Under acidic conditions, inter-reaction between the anionic and cationic groups occurred as evidenced by a heavy white precipitate.

EXAMPLE XVIII (A) 145 grams of an ethylene maleic copolymer in its anhydride form and contain equimolar amounts of ethylene and of maleic anhydride were added to 500 cc. of hot water, and heated until dissolved.

84 grams dicyandiamide were added to the polymer solution and refluxing for 5 hours at 90° to 95° C. was carried out. The resulting reaction mixture was dehydrated and product heated for 2 hrs. between 110° C. to 120° C. for further condensation.

The reaction product was then dissolved in 600 cc. water and 326 grams of formaldehyde were added. The temperature was brought up to 90° C. to 95° C. and stirring in reflux equipment for 3 hours was carried out. The reaction product was then neutralized with caustic soda to a pH of 9.0. Addition of acid produced a heavy white precipitate.

(B) 970 grams of a 25% by weight aqueous solution of a styrene-maleic acid copolymer in the form of its monosodium salt was mixed with 84 grams of dicyandiamide. The above polymer was obtained by copolymerizing equimolar quantities styrene and maleic anhydride. To the above mixture of polymer and dicyandiamide, 300 grams of water were added and the resulting material heated at about 80° C. until a clear solution was obtained. Thereafter this material was spray dried. 308 grams of the powder resulting from the spray drying step was then heated at 120° C. for 3 hours. The resulting condensation product was introduced into a vessel fitted with a reflux condenser. 1400 grams of water were added and the condensation product dissolved in the water by heating for one-half hour at 80° to 90° C. When a solution was obtained, 243 grams of formaldehyde (37% by weight of aqueous solution) was introduced and further reaction carried out by heating for 4 hours at 85° to 90° C.

EXAMPLE XIX 104 grams of sodium bisulfite and 81.5 grams formaldehyde (37% by weight aqueous solution) were added to 100 cc. of water and mixed to form a clear solution. 84 grams dicyandiamide were then added to the solution. The solution was refluxed for 3 hours at 95° C. to produce the sodium salt of sulfomethyl dicyandiamide. This salt was added to a solution of 126 grams of an ethylene maleic co-polymer containing equimolar amounts of ethylene and maleic anhydride in its anhydride form and 400 cc. of water.

The resulting slurry was dehydrated and heated in an oven for 3 hours at 120° C. to condense the salt and the ethylene maleic copolymer.

The amphoteric product thus formed was easily soluble in water. When neutralized with sodium hydroxide to pH of 8 to 9, the resulting salt possessed good pigment dispersing properties. The product also has substantive properties in regard to metal tannages.

In solution, this amphoteric product can be mixed with stable aminoplast resins. When inter-reacted under acidic conditions, the reaction product is of a colloidal nature, i.e., in the form of a milky solution.

EXAMPLE XX 98 grams of maleic anhydride, 84 grams of dicyandiamide and 400 cc. water were mixed together and refluxed for 6 hours at temperatures between 100° C. to 105° C. To the above was added a solution of 126 grams of a hydrolyzed ethylene maleic copolymer in its acid form obtained from a copolymer containing equimolar amounts of ethylene and maleic anhydride and 400 cc. water.

This mixture was dehydrated and condensed by heating in oven for about 3 hours at 115° to 120° C.

The reaction between maleic anhydride and dicyandiamide leads to the chemical modification of dicyandiamide as shown by the disappearance of the nitrile group. Also, in this reaction the double bond of the maleic acid disappears. The maleic ethylene copolymer also reacts with the maleic dicyandiamide condensate upon the application of heat. The reaction complex is clearly soluble in water and is not precipitated by addition of acid. When neutralized and brought to a pH between 8 and 9, the resulting condensate is useful as a dispersing agent.

EXAMPLE XXI 130 grams of itaconic acid and 84 grams of dicyandiamide were added to 300 cc. water. The resulting admixture was refluxed for 5 hours between 100° C. to 105° C. Thereafter, a solution of 126 grams of a hydrolyzed maleic ethylene copolymer in its free acid form obtained from a copolymer containing equimolar amounts of ethylene and maleic anhydride and 400 cc. water were added to the reaction product of the itaconic acid and dicyandiamide.

This mixture was dehydrated and condensed by heating in oven for about 3 hours at 115° to 120° C.

This condensation product was a white powder which dissolved easily in warm water to form a clear solution. When neutralized to pH of between 8 and 9, the resulting salt demonstrated pigment dispersing properties. It has direct affinity for metal salt tanned leather and produces a bleaching effect on chrome stock. When the cation active functional group is activated by the addition of acid, a semi-colloidal solution results. This weak inter-reaction promotes a better penetration of the treated leather.

EXAMPLE XXII 104 grams of sodium bisulfite, 100 cc. of water and 81.5 grams of formaldehyde (37% by weight aqueous solution) were mixed together and as a result of an exothermic reaction, the sodium salt of sulfohydroxy methane was formed. Then 84 grams of dicyandiamide were added, the mixture refluxed 95° C. for 1 hour, 163 grams of formaldehyde (37% by weight aqueous solution) was added and the reaction was completed by heating under reflux for 5 hours at 95° C. Then a solution of 160 grams of an amide ammonium salt of a maleic ethylene copolymer and 840 cc. water was added and the mixture heated for 1½ hours at 80° C. for further condensation. The amide ammonium salt was prepared from a polymer containing equimolar quantities of maleic anhydride and ethylene.

The resulting amphoteric product inter-reacts under acidic conditions by forming a semi-colloidal slightly milky solution. When applied on chrome stock it confers to the leather an excellent soft and smooth feel as well as a good bleaching effect. Also, a stable solution of the amphoteric product can be mixed with stable cationic aminoplast resins with the effect of producing a stronger inter-reaction under acid conditions.

EXAMPLE XXIII

A mixture of 130 grams of itaconic acid, 84 grams of dicyandiamide and 300 cc. of water were refluxed for 7 hours between 100° C. to 105° C. Then 30 grams of paraformaldehyde and 163 grams of formaldehyde (37% by weight aqueous solution) were added and refluxing for 4 hours at 95° C. was carried out. The resulting reaction product was cooled and neutralized with ammonium hydroxide to a pH of 8.3.

Then a solution of 160 grams of an amide ammonium salt of maleic ethylene copolymer and 840 cc. water was added and heated for 3 hours at 95° C. was carried out.

The resulting product formed a clear and stable solution. By activation of the cationic functional group through addition of acid to lower the pH, a white precipitate is formed through inter-reaction of the anionic and cationic functional groups.

The amide ammonium salt was the same as the amide ammonium salt of Example XXII.

EXAMPLE XXIV

A mixture of 130 grams of itaconic acid, 84 grams of dicyandiamide and 500 grams of water were refluxed for 5 hours at 102° C. to 105° C. after which 61 grams paraformaldehyde were added. Further condensation was achieved by heating for 3 hours at 100° C. 162 grams formaldehyde (37% by weight aqueous solution) were then introduced and the condensation completed by heating for 3 hours. The resulting product was an amphoteric aminoplast resin. The product was then neutralized with caustic soda to a pH of 8.5.

A solution containing 160 grams of an amide ammonium salt of a maleic ethylene copolymer and 480 grams of water was added and condensed with the amphoteric aminoplast resin by heating under reflux for 3 hours at 100° C. The complex amphoteric product formed stable solutions which are useful for impregnating porous materials.

The amide ammonium salt of the maleic ethylene copolymer was the same as the amide ammonium salt of Example XXII.

It is in many cases sufficient to have this condensation product as well as similar products combined with porous materials by direct affinity. When applying them on chrome tanned leather enhanced fullness and enhanced bleaching effects were observed. However, increased fixation can be easily affected by activating the cationic functional groups of the molecule by adding organic or inorganic acids or metal salts of acidic character to lower the pH. The product of this example also can be used in fiber treatment and in paper making.

EXAMPLE XXV 160 grams of an amide ammonium salt of a maleic ethylene copolymer were dissolved in 840 grams of water. To the resulting solution, there was added with stirring 285 grams of an aqueous solution of the sodium salt of sulfohydroxymethane obtained by condensing 104 grams of sodium bisulfite and 81 grams of formaldehyde (37% by weight aqueous solution) in the presence of 100 grams of water. The above mixture was then heated for 6 hours at 95° C. to 100° C., thus producing condensation between the reactive methylol group and the reactive amide functional group of the copolymer.

The product after condensation formed a stable solution. A non-hygroscopic white powder was prepared by evaporation of the water. This is preferably performed through spray drying. The product is a good pigment dispersing agent. Neutral solutions of this condensation product can also be used as an anionic material for retanning and bleaching chrome tanned leather. The product also can be mixed with aminoplast resins of various degrees of cation activity and produces inter-reaction therewith upon the addition of the acid.

The amide ammonium salt was the same as that utilized in Example XXII.

EXAMPLE XXVI 145 grams of an anionic linear polymer (obtained by copolymerizing equimolar quantities of maleic anhydride and ethylene) in the form of its free acid was introduced into 500 cc. of water. Heat was applied until a clear solution was obtained. Then, 84 grams of dicyandiamide were introduced into the solution and refluxing for 5 hours at 90° to 95° C. was carried out. Thereafter, the water present in the reaction product was evaporated off and the remaining material further heated at 120° C. for 2 hours. The resulting product was clearly soluble in water and a 5% aqueous solution had a pH of 5.

211 grams of the product prepared above were dissolved in 600 cc. of water with the application of heat. The solution was then cooled to 25° C. and 110 grams of sodium hydroxide (40 Bé solution) were slowly added to the solution. During the addition, the temperature was maintained under 30° C. Then, 326 grams of a 37% by weight aqueous solution of formaldehyde and 32 grams of methyl alcohol were added and the solution stirred and refluxed at temperatures between 80° and 85° C. for 4 hours. Thereafter, the reaction product was cooled down and the product recovered.

EXAMPLE XXVII 110 grams of the amide ammonium salt of the maleic styrene copolymer used in Example XXII, were slowly introduced under stirring into 623 grams of water preheated at 80° C.

When the copolymer was dissolved, 65 grams itaconic acid were slowly introduced. A viscous white precipitate was first formed. By maintaining the temperature at 80° C. for 2 hours and applying strong stirring, the precipitate slowly redissolved and a clear solution resulted.

This product which was a complex lactam, in its acid form or as a neutralized salt was found to have direct affinity for rawhide and for metal salt tanned leather. When applied on chrome stock, excellent bleaching effects were obtained. When used in pretanning on pickled stock, followed by formation of metal complexes such as by using aluminum salts, white tannages were obtained which were lightfast and which in some instances showed shrink temperatures as high as 100° C. This product when neutralized to form an anionic complex salt can be mixed with stable aminoplast resins to form stable solutions. Inter-reaction between cationic and anionic functional groups was produced by acidifying to lower the pH.

Solutions of the product prepared according to this example were also found to have excellent binding properties and are useful as adhesives.

EXAMPLE XXVIII 160 grams of an amide ammonium salt of an ethylene maleic copolymer which was the same as the amide ammonium salt used in Example XXII, 130 grams of itaconic acid and 870 grams of water were mixed and heated between 100° C. to 102° C. for 5 hours. The resulting lactam was found to have excellent bleaching and filling action on chrome stock. This product when used as a retan also produced a soft and smooth grain and was light fast. The product is also a valuable material for pigment dispersing when neutralized to pH of about 8.0 to 9. In the acidic or neutralized form it can be mixed with stable aminoplast resins. When such compositions are absorbed by porous materials, inter-reaction to form a precipitate can be obtained by the addition of acids and hydrolysis by further addition of water.

EXAMPLE XIX 104 grams of sodium bisulfite were dissolved in 100 grams of water, followed by the addition of 81.5 grams of formaldehyde (37% by weight aqueous solution). The reaction was completed by raising and maintaining the temperature at 75° C. for 30 minutes. Then 68 grams of ammonium hydroxide (1 mol) were added.

The sodium salt of sulfo amino methane thus formed was mixed with 970 grams of a 25% by weight aqueous solution of a monosodium salt of a partially neutralized styrene maleic copolymer which contained approximately equimolar amounts of styrene and maleic anhydride. This solution was evaporated and heated above 100° C. for the reaction between the components. This was accomplished by spray drying the material at elevated temperatures whereby the incoming heated air stream was at temperatures between 190° to 220° C.

It is well known that the monosodium salt of the styrene maleic copolymer is precipitated out of solution by the addition of acid. However, the product of this example can be acidified to low pH values without precipitation. The product has direct affinity for metal salt tannages producing particularly on chrome stock excellent bleaching and filling action. The product shows also improved effects compared to the linear polymer when subsequently dyed.

This material can also be used for direct tannages of pickled stock. When, after absorption, metal salts are applied, tannages can be produced showing shrink temperatures above 90° C.

The anionic product formed by the above prescribed procedure can be mixed with stable aminoplast resins to form stable solutions from which inter-reacted precipitates can be produced by adition of acids.

EXAMPLE XXX 1285 grams of the reaction product as obtained in Example XXV were further reacted with 81 grams formaldehyde (37% by weight aqueous solution) by heating for 2 hours at 50° C. The original pH showed a value of 5.7 which dropped after reaction with formaldehyde reaction to 4.2.

The thus formed methylolamine condensed with the remaining hydrogen of the amide functional group.

The free carboxy group which was formed was subsequently neutralized to a pH 8.0. This reaction product has a much improved tolerance to heavy metal salts as compared with the product of Example XXV.

This material has excellent pigment dispersing properties and can be used as an auxiliary tanning compound similar to the product of Example XXV.

EXAMPLE XXXI 130 grams itaconic acid and 168 grams dicyandiamide were dissolved in 300 grams water. The pH of a 5% solution was 3.1. The solution was then heated for 5 hours at 105° C. At this time, a 5% solution had a pH of 7.0. 486 grams of formaldehyde (37% by weight aqueous solution) were then added. The reaction product was then heated for 3 hours at 95° C. and neutralized to a pH of 8.0. The product so obtained formed a clear and stable solution.

This product reacted with anionic linear polymers in their water soluble form by addition of acids thus producing a heavy precipitate.

EXAMPLE XXXII (A) 130 grams (one mol) of itaconic acid were dissolved in 500 cc. of distilled water by heating to 60° C. Then 106 grams of sodium carbonate were added to the itaconic acid solution to form the disodium salt of itaconic acid. The pH of the solution was 5.2. Then 171 grams (three mols) of acrylamide were dissolved in the itaconic acid solution.

To copolymerize the acrylamide and the salt of itaconic acid, 5 grams of potassium persulfate were introduced and the temperature of the solution raised to 70° C. An exothermic reaction occurred and the temperature rose to 108° C. After cooling, heating was continued for 4 hours at temperatures between 70° to 75° C. Finally, 541 grams of distilled water was added to the reaction product, thus forming a solution having approximately 25% by weight solids. The pH of a 10% solution was 7.7. This product was found to be a very good dispersing agent and adhesive. Also this product can be admixed with cationic aminoplast resins and the mixture used to treat various substrates such as leather by bringing about interreaction of its functional groups by addition of acid.

(B) The above procedure was repeated except that two mols of acrylamide were utilized in the polymerization with one mol of the disodium salt of itaconic acid. This product was found to be a very good dispersing agent.

EXAMPLE XXXIII

The procedure of Example XXXII was repeated to obtain the copolymer of acrylamide and the sodium salt of itaconic acid. To the resulting copolymer, 330 grams of a 40° Bé solution of sodium hydroxide was introduced through a funnel during the course of 25 minutes. The temperature was progressively raised to 92° C. whereupon ammonia gas was evolved. The temperature was gradually increased to 100° C. with strong stirring. Heating at this temperature with stirring was maintained until the ammonia was largely eliminated. This required about four hours. Thus, the amide groups of the copolymer were saponified to carboxy groups in the form of their sodium salt. This product can be spray or drum dried to form solids. This product has been found to be a more superior dispersing agent than the corresponding unsaponified product, i.e., the product of Example XXXII.

EXAMPLE XXXIV 130 grams (one mole) of itaconic acid were introduced into 500 cc. of distilled water and the resulting mixture heated to 50° C. to dissolve the itaconic acid. After the itaconic acid was dissolved, 171 grams (three moles) of acrylamide were added with stirring until the acrylamide was dissolved. Then 2.5 grams of potassium persulfate were added, the material stirred and heat applied until a temperature of about 70° C. was reached. At this temperature the application of heat was stopped since an exothermic reaction took place. As a result, the temperature rose gradually to 107° C. Stirring was continued for two hours during which time the temperature dropped to 60° C.

In the above manner, a strongly-viscous material was obtained. A 5% aqueous solution had a pH of 4.3. The product of this example can be mixed with cationic aminoplast resins for treatment of substrates such as leather. Upon the addition of acids, interreaction occurs and a white precipitate forms. The product of this example can also be used alone for retanning and bleaching chrome tanned leather particularly if such operation is followed by an after treatment with metallic salts such as aluminum sulfate and zirconium sulfate.

EXAMPLE XXXV 800 grams (1 mole) of the product prepared according to Example XXXIV were mixed with 1056 grams (2 moles) of a stable cationic aminoplast resin prepared according to Example VIII. 410 grams of water were then added.

The two products which were mixed as indicated above were in molar proportions and represent a salt composed of an anionic linear polymer and a cationic aminoplast resin. By the addition of acids, interreaction of the active groups occur. The product of this example has been found to be especially useful as a retanning and bleaching material for chrome tanned leather. By its use a tight grain is obtained.

EXAMPLE XXXVI 500 grams of the product prepared as described in Example XXXII and 500 grams of the cationic aminoplast resin prepared as described in Example VII were brought together and mixed by stirring and heating at a temperature of about 50° C.

The following examples are directed to the use of my compositions heretofore described.

EXAMPLE XXXVII 100 pounds of chrome tanned sheep skins were placed in a rotating drum and the pH adjusted to 4.2 with sodium bicarbonate. The sheep skins were then washed for 10 minutes at 120° F. and drained. Thereafter 100% by weight of water based on the weight of the skins was introduced into the drum. The product of Example XXXIV in an amount of 10% by weight of the skins was added to the drum and the drum rotated for one hour. Thereafter aluminum sulfate in an amount of 3% by weight of the skins was introduced into the drum and the drum run for an additional 20 minutes. The cationic aminoplast resin described in Example VII was introduced into the drum in an amount of 2% by weight of the skins. The skins were then drummed, i.e., the drum rotated for an additional 15 minutes, washed for 10 minutes at a 120° F., drained and fat liquored.

The chrome tanned leather retanned as indicated above demonstrated excellent feel as well as a bleaching effect of a high order.

EXAMPLE XXXVIII 100 pounds of chrome tanned sheep skins were placed in a rotating drum and the pH adjusted to 4.2 with sodium bicarbonate. The skins were washed for 10 minutes at 120° F. and drained. Thereafter, 100% by weight of water based on the weight of the skins was introduced into the drum. The product of Example XXXV was introduced into the drum in an amount of 10% by weight of the skins. The drum was rotated for one hour after which formic acid was introduced in an amount equal to 0.5% by weight of the skins. The skins were drummed for an additional one-half hour, washed for 10 minutes at 120° F., drained and fat liquored.

EXAMPLE XXXIX 100 pounds of pickled sheep skins were placed in a rotating drum containing 200 pounds of a 2.5% by weight aqueous salt solution and the drum rotated for 10 minutes. Then the product of Example XXVII, neutralized to a pH of 7.5, was added to the drum in an amount of 25% by weight of the skins. After this addition, the skins were drummed for 5 hours, then 10% by weight of the skins of formic acid was introduced and the skins drummed for an additional one-half hour. Basic aluminum acetate in an amount of 10% by weight of the skins was introduced and the skins drummed for an additional 4 hours. At this point, the pH of the tanned liquor was 4.2. The pH was then raised to 4.8 by addition of sodium bicarbonate. The skins were then drained, washed and fat liquored.

The resulting white tannage had a shrink temperature of 100° C.

EXAMPLE XL 100 pounds of chrome tanned sheep skins were placed in a rotating drum and the pH adjusted to between 4.0 and 4.2 with sodium bicarbonate. This stock was then washed for 10 minutes at 120° F. and drained. Then 100% by weight of water based on the weight of the stock was introduced into the drum. To the drum was added the product of Example XXIX in powdered form and in an amount equal to 3% by weight of the stock. The stock was then drummed for one hour after which formic acid in an amount of 0.25% by weight of the stock was added. The stock was drummed for an additional 15 minutes after which another addition of formic acid in the same quantity was made. The stock was drummed for 15 minutes, drained and washed. Then 8% by weight of the stock of the cationic aminoplast resin of Example VIII was added and the stock drummed for one hour. The stock was washed for 10 minutes at 120° F., drained and fat liquored.

EXAMPLE XLI 100 pounds of chrome tanned sheep skins were placed in a rotating drum and the pH adjusted to between about 4.0 to 4.2 with sodium bicarbonate. The skins were then washed for 10 minutes at 120° F. The washed stock was drained and water equal to 100% by weight of the stock and having a temperature of 120° F. was introduced into the drum. The product of Example XV was then introduced into the drum in an amount of 10% by weight of the stock and the stock drummed for one hour. Then 0.5% by weight of the stock of formic acid was added and the stock drummed for an additional 20 minutes. Finally, the stock was washed for 10 minutes at 120° F., drained and fat liquored.

EXAMPLE XLII 100 pounds of chrome tanned sheep skins were introduced into a rotating drum and the pH adjusted to between 4.0 and 4.2 with sodium bicarbonate. The skins were then washed for 10 minutes at 120° F. After draining, water equal to 100% by weight of the stock was introduced into the drum. Then the product of Example XXII in an amount of 15% by weight of the stock was introduced and the drum rotated for one hour. Thereafter, 0.25% by weight of formic acid was added and the stock drummed for 20 minutes. The stock was then washed for 10 minutes at 120° F., drained and fat liquored.

EXAMPLE XLIII 100 pounds of chrome tanned sheep skins were placed in a rotating drum and the pH adjusted to between about 4.0 and 4.2 with sodium bicarbonate. This stock was then washed for 10 minutes at 120° F. After draining the washed stock, water equal to 100% by weight of the stock, and having a temperature of 120° F. was added to the drum. Then the product of Example VI, in an amount of 10% by weight of the stock was introduced into the drum and the stock drummed for one hour. Then 1% of formic acid based on the weight of the stock was introduced and the stock drummed for an additional 20 minutes. The stock was washed for 10 minutes at 120° F., drained and fat liquored.

EXAMPLE XLIV 100 pounds of chrome tanned sheep skins were placed in a rotating drum and the pH adjusted to between 4.0 and 4.2 by the addition of sodium carbonate. This stock was washed for 10 minutes at 120° F. and drained. Then water was added to the rotating drum equal to 100% by weight of the stock and maintained at a temperature of 120° F. To the drum there was added the product of Example V in an amount of 10% by weight of the stock. The drum was rotated for one hour after which 0.5% based on the weight of the stock, of formic acid was added. The stock was run for an additional 20 minutes, washed for 10 minutes at 120° F., drained and fat liquored.

EXAMPLE XLV 100 pounds of chrome tanned sheep skins were placed in a rotating drum and the pH adjusted to between 4.0 and 4.2 by the addition of sodium bicarbonate. The skins were washed for 10 minutes at 120° F., drained and then water in an amount of 100% by weight of the skins was added to the drum. The product of Example IX in an amount of 10% by weight of the skins was added and the stock drummed for one hour. Then formic acid in an amount of 0.25% by weight of the skins was added and the skins drummed for 15 minutes. Finally, the stock was washed for 10 minutes at 120° F., drained and fat liquored.

EXAMPLE XLVI

The procedure of Example XLV was repeated on a different batch of chrome tanned sheep skins. However, in this example, the product of Example III in an amount of 10% by weight of the skins was used instead of the product of Example V.

EXAMPLE XLVII 100 pounds of shaved chrome tanned side leather were placed in a rotating drum and the pH was adjusted to 4. The leather was washed for 10 minutes at 90° F., washed at 125° F. and then drained. Then water in an amount of 150% by weight of the leather was added to the drum. The water was maintained at a temperature of 125° F. Then the product of Example VII in an amount of 10% by weight of the leather was introduced into the drum and the leather drummed for 30 minutes. An additional 10% by weight of the leather of the product of Example VII was added and drumming continued for one and one-quarter hours. Formic acid in an amount of 0.25% by weight of the leather was introduced and drumming continued for 15 minutes. An additional 0.25% by weight of the formic acid based on the weight of the leather was added and drumming for another 15 minutes was carried out. The same amount of formic acid was again introduced and drumming for 30 minutes was carried out. The leather was drained, refloated at 70° F. and finally drummed for 10 minutes. Then the leather was drained, washed for 10 minutes at 110° F. and fat liquored.

This retanned leather demonstrated good fullness and excellent bleaching effect.

EXAMPLE XLVIII 100 pounds of chrome tanned sheep skins were placed in a rotating drum and the pH adjusted to 4.7 with sodium bicarbonate. The skins were washed for 10 minutes at 120° F. and water at 120° F. and in an amount equal to 100% by weight of the sheep skins was added to the drum. The product of Example VII in an amount of 15% by weight of the skins was added and the stock drummed for 1 hour. Then 1% by weight of the skins of formic acid was introduced and the stock drummed for one-half hour. Thereafter, the skins were washed for 10 minutes at 120° F., drained and fat liquored.

EXAMPLE XLIX

The procedure of Example XXXVIII was repeated on a different batch of chrome tanned sheep skins. However, in this example the product of Example XXXVI in an amount of 10% by weight of the skins was used instead of the product of Example XXXV.

EXAMPLE L 100 pounds of chrome tanned sheep skins were placed in a rotating drum and the pH was adjusted to 4.0 with sodium bicarbonate. The skins were washed for 10 minutes at 122° F. drained and water at 122° F. and in an amount of 150% by weight of the skins was introduced into the drum. The product of Example XXVI in an amount of 15% by weight of the skins was added and the skins drummed for one hour. Thereafter, formic acid in an amount of 0.5% to weight of the skins was added and the skins drummed for an additional 15 minutes. The skins were then drained, washed for 10 minutes at 122° F., drained again and fat liquored.

EXAMPLE LI 100 pounds of chrome tanned sheep skins were placed in a rotating drum and the pH adjusted to 4.0 with sodium bicarbonate. The skins were washed for 10 minutes at 122° F. and water in an amount of 150% by weight of the skins was added to the drum. The product of Example XXVII in an amount of 10% by weight of the skins was introduced and the skins drummed for one hour. Thereafter a stable cationic aminoplast resin described in Example VII was introduced in an amount of 5% by weight of the skins. The skins were then drummed for ½ hour, drained, washed for 10 minutes at 122° F., drained again and fat liquored.

EXAMPLE LII 100 pounds of chrome tanned sheep skins were placed into a rotating drum and the pH adjusted to 4.2 with sodium bicarbonate. The skins were washed for 10 minutes at 122° F. and then drained. Water at 122° F. and in an amount of 150% by weight of the skins were added to the drum. Then, the product of Example XXVII in an amount of 10% by weight of the skins was added and the skins drummed for one hour. Thereafter aluminum sulfate in an amount of 2% by weight of the skins was added and the skins drummed for ½ hour. Finally, the skins were drained, washed and fat liquored.

EXAMPLE LIII

The procedure of Example LII was repeated on a different batch of chrome tanned sheep skins. However, in this example, the product of Example XXXV in an amount of 10% by weight of the skins was used instead of the product of Example XXVII.

EXAMPLE LIV 100 pounds of shaved chrome tanned side leather were placed into a rotating drum and the pH was adjusted to 4.0 with sodium bicarbonate. The skins were washed for 15 minutes at 125° F., drained and then water at 125° F. and in an amount of 150% by weight of the leather was added to the drum. The product of Example XXVIII in an amount of 5% by weight of the leather was added and the leather drummed for one-half hour. An additional quantity of the product of Example XXVIII in an amount of 5% by weight of the leather was introduced and the skins drummed for one additional hour. The leather was drained, washed for 10 minutes at 110° F., drained again and fat liquored.

EXAMPLE LV 100 pounds of chrome tanned calf skins were placed in a rotating drum and the pH adjusted to 4.0 with sodium borate. The skins were washed for 10 minutes at 120° F. drained and water at 120° F. and in an amount of 150% by weight of the skins was added to the drum. Then the product of Example XVII in an amount of 5% by weight of the skins was introduced and the skins drummed for one-half hour. An additional amount of the product of Example XVII was added in an amount of 5% by weight of the skins and the skins drummed for an additional half hour. Then formic acid in an amount of 0.25% by weight of the skins was introduced and the skin drummed for 15 minutes. Another addition of the same quantity of formic acid was made and the skins drummed again for 15 minutes. Finally, the skins were drained, washed for 10 minutes at 120° F., drained again and fat liquored.

EXAMPLE LVI

In this example, the products of Example XXXIIA, Example XXXIIB and XXXIII utilized as aqueous solutions containing 25% by weight of solids and Examples XXV and XXX utilized as powdered materials were evaluated as pigment dispersants for a non-dispersed kaolin (KCS obtained from Georgia Kaolin Co.) and titanium dioxide (TiPr–610 of duPont).

The following procedure was used. The kaolin or the titanium dioxide was added in increments with high speed stirring to water containing one of the above products to be tested. Sufficient kaolin was used so that the resulting pigment suspension contained 62% by weight of the total, of kaolin. In the case of the titanium dioxide suspensions, enough titanium dioxide was used so that the resulting pigment suspension contained 61% by weight of the total, of titanium dioxide. The amount of product to be tested was 0.25% by weight of the pigment except where indicated otherwise. Viscosity measurements of the suspensions were made at 25° C. using a Brookfield viscosimeter. Tables I and III reproduce the data. The viscosities are related to the flow properties of the suspensions and indicate the deflocculating or dispersing power of the materials tested. That is, the deflocculating or dispersing power of a material is determined by its ability to produce fluid suspensions.

After the viscosities were determined as indicated above, a latex containing 48± 1.5% by weight of a styrene-butadiene copolymer in a 60:40 ratio (Dow latex 512-R) was added with mixing to the suspensions prepared above. The amount of latex utilized on a solids basis was 12% by weight of the pigment thus giving a 60% total solids content to the suspension in the case of the kaolin suspension and a 59% by weight of total solids content in the case of titanium dioxide suspensions. Viscosities were again determined at 25° C. using a Brookfield viscosimeter. Tables II and IV reproduce the data. These compositions are paper coating compositions wherein the latex is used as the binder.

Where no dispersing agent was used, the pigment when added to water formed a non-flowable solid. This observation is omitted from the tables.

TABLE I.—SUSPENSIONS CONTAINING KAOLIN AS THE PIGMENT

| Product of Example No. | Percent by wt. of product based on wt. of pigment [1] | Viscosity Determination | | | |
|---|---|---|---|---|---|
| | | Spindle No. | R.p.m. | Visc. (cps.) | Visual Observation |
| XXXIIA | 0.25 | 1 | 12 | 50 | Thin fluid. |
| | | 1 | 30 | 38 | Do. |
| | | 1 | 60 | 36 | Do. |
| XXXIIB | 0.25 | 2 | 12 | 250 | Free flowing fluid. |
| | | 2 | 30 | 250 | Do. |
| | | 2 | 60 | 270 | Do. |
| XXXIII | 0.25 | 2 | 12 | 410 | Do. |
| | | 2 | 30 | 280 | Do. |
| | | 2 | 60 | 206 | Do. |
| XXV | 0.50 | 2 | 12 | 400 | Do. |
| | | 2 | 30 | 270 | Do. |
| | | 2 | 60 | 190 | Do. |
| XXX | 0.40 | 1 | 12 | 70 | Thin fluid. |
| | | 1 | 30 | 54 | Do. |
| | | 1 | 60 | 46 | Do. |

[1] Where product is a liquid, the percent is percent of product on a dry basis.

TABLE II.—SUSPENSIONS CONTAINING KAOLIN AS THE PIGMENT AND LATEX SOLIDS

| Product of Example No. | Percent by wt. of product based on wt. of pigment [1] | Viscosity Determination | | | |
|---|---|---|---|---|---|
| | | Spindle No. | R.p.m. | Visc. (cps.) | Visual Observation |
| XXXIIA | 0.25 | 1 | 12 | 115 | Thin fluid. |
| | | 1 | 30 | 106 | Do. |
| | | 1 | 60 | 88 | Do. |
| XXXIIB | 0.25 | 1 | 12 | 125 | Do. |
| | | 1 | 30 | 110 | Do. |
| | | 1 | 60 | 95 | Do. |
| XXXIII | 0.25 | 2 | 12 | 740 | Heavy fluid. |
| | | 2 | 30 | 490 | Do. |
| | | 2 | 60 | 314 | Do. |
| XXV | 0.50 | 1 | 12 | 120 | Thin fluid. |
| | | 1 | 30 | 90 | Do. |
| | | 1 | 60 | 66 | Do. |
| XXX | 0.40 | 1 | 12 | 80 | Do. |
| | | 1 | 30 | 60 | Do. |
| | | 1 | 60 | 49 | Do. |

[1] Where product is a liquid, the percent is percent of product on a dry basis.

TABLE III.—SUSPENSIONS CONTAINING TITANIUM DIOXIDE AS THE PIGMENT

| Product of Example No. | Percent by wt. of product based on wt. of pigment [1] | Viscosity Determination | | | |
|---|---|---|---|---|---|
| | | Spindle No. | R.p.m. | Visc. (cps.) | Visual Observation |
| XXXIIA | 0.31 | 3 | 12 | 4,800 | Heavy flowing liquid approaching a soft paste. |
| | | 3 | 30 | 2,200 | Do. |
| | | 3 | 60 | 1,280 | Do. |
| XXXIIB | 0.31 | 3 | 12 | 1,900 | Heavy flowing liquid. |
| | | 3 | 30 | 1,100 | Do. |
| | | 3 | 60 | 620 | Do. |

[1] The percent is percent of product on a dry basis.

TABLE IV.—SUSPENSIONS CONTAINING TITANIUM DIOXIDE AS THE PIGMENT AND LATEX SOLIDS

| Product of Example No. | Percent by wt. of product based on wt. of pigment [1] | Viscosity Determination | | | |
|---|---|---|---|---|---|
| | | Spindle No. | R.p.m. | Visc. (cps.) | Visual Observation |
| XXXIIA | 0.31 | 2 | 12 | 770 | Heavy flowing liquid. |
| | | 2 | 30 | 430 | Do. |
| | | 2 | 60 | 260 | Do. |
| XXXIIB | 0.31 | 2 | 12 | 650 | Do. |
| | | 2 | 30 | 350 | Do. |
| | | 2 | 60 | 210 | Do. |

[1] The percent is percent of product on a dry basis.

From the foregoing data, it can be seen that the above products function as deflocculating or dispersing agents for pigment water suspensions and pigment-water-latex-suspensions.

The viscosity determinations were repeated on the above suspensions which contained the latex after allowing the suspensions to stand for 24 or 48 hours. Before making the determinations, the products were remixed by shaking. From the resulting viscosity data, it was found that the suspensions were stable after standing for 24 or 48 hours.

EXAMPLE LVII

The anionic linear polymer described in Example XXXIII has been shown to demonstrate good pigment dispersing characteristics. See Example LVI. Moreover, the polymer is valuable as a dye assistant when applied to natural or synthetic yarns or fabrics on the neutral or alkaline side. Thus, it has been found that marked leveling effects are obtained when utilizing this product as a dye assistant for vat dyes, neutral dyeing acid dyes and neutral premetalized dyes. In this example, the use of the product of Example XXXIII as a leveling agent for artificial fibers is described.

2% of the product of Example XXXIII, based on the weight of Nylon #6 yarn, was added to three different dye baths each having a liquor to fiber weight ratio of approximately 40 to 1 and each containing a dye in the amount of 2% by weight of the yarn. One dye bath contained Alizarian Sky Blue BSCF, the second dye bath contained Supra Light Rubine BLACF and the third dye bath contained Irgalan Grey BL. The pH of each dye bath was adjusted to approximately 8.0 with tetra-sodium pyrophosphate. The temperature of the bath was maintained at 180° F. The material dyed in each of the dye baths was Nylon #6 yarn. Leveling took place at the above temperature and the dyeing of the yarn was carried out between approximately 1 to 2 hours under the above temperature.

EXAMPLE LVIII

In this example, the light resistance of leather treated with a number of the products heretofore described was determined.

Leather samples of approximately 1″ x 3″ which were obtained according to the treatments described in Examples XXXVII through XLVI and Examples XLIX through LIV were submitted to ultraviolet light radiation to test their light resistance. First, one-half of each leather sample was covered to serve as a control. The samples were then placed in the bottom of a box having dimensions of 14″ x 14″ x 14″. A sun lamp having a 275 watt bulb (type R.S. Westinghouse) was placed at a distance of 10″ from the samples. The samples were continuously exposed to the rays of the lamp for 72 hours. The temperature at the bottom of the box during exposure varied from 130° F. to 150° F. At the conclusion of the exposure of the samples to the ultraviolet rays, the samples were examined visually. In each instance, the portion of the samples which was exposed to the sun lamp did not show any noticeable color change when compared with the protected control.

Having described my invention, what I claim is new and desire to secure by Letters Patent is:

1. Amphoteric nitrogen containing materials consisting essentially of condensates prepared by heating at reflux temperatures for about 4 to about 6 hours approximately equimolar quantities of dicyandiamide and a member of the group consisting of itaconic acid, monoammonium salts thereof, maleic acid, monoammonium salts thereof and maleic anhydride.

2. Amphoteric nitrogen containing materials consisting essentially of condensates prepared by heating at reflux temperatures for about 4 to about 6 hours approximately equimolar quantities of dicyandiamide and aminohydroxy methane.

References Cited

UNITED STATES PATENTS 2,481,526   9/1949   Nagy _____ 260—404.5

JOSEPH L. SCHOFER, *Primary Examiner.*

L. WOLF, J. KIGHT, III, *Assistant Examiners.*